United States Patent [19]
Park

[11] Patent Number: 5,587,805
[45] Date of Patent: Dec. 24, 1996

[54] METHOD FOR RECORDING IMAGES IN A DIGITAL VIDEO CASSETTE RECORDER

[75] Inventor: Ku-man Park, Seoul, Rep. of Korea

[73] Assignee: Samsung Electronics Co., Ltd., Kyungki-do, Rep. of Korea

[21] Appl. No.: 158,827

[22] Filed: Nov. 29, 1993

[30] Foreign Application Priority Data

Nov. 28, 1992 [KR] Rep. of Korea ............... 92-22705
Oct. 15, 1993 [KR] Rep. of Korea ............... 93-21451

[51] Int. Cl.$^6$ .............................. H04N 5/92; H04N 5/782
[52] U.S. Cl. .......................... 386/68; 386/111; 386/112
[58] Field of Search ............................... 358/335, 310, 358/312; 360/33.1, 32, 10.1; 348/390, 397, 403, 420; H04N 5/920

[56] References Cited

U.S. PATENT DOCUMENTS

| | | | |
|---|---|---|---|
| 5,068,744 | 11/1991 | Ito | 358/310 |
| 5,148,272 | 9/1992 | Acampora et al. | 348/390 |
| 5,231,487 | 7/1993 | Hurley et al. | 358/335 |
| 5,282,049 | 1/1994 | Hatakenaka et al. | 358/335 |
| 5,309,290 | 5/1994 | Sugiyama et al. | 360/32 |
| 5,309,292 | 5/1994 | Takakura | 360/32 |
| 5,313,471 | 5/1994 | Otaka et al. | 358/310 |
| 5,339,108 | 8/1994 | Coleman et al. | 358/335 |
| 5,351,131 | 9/1994 | Nishino et al. | 358/335 |

FOREIGN PATENT DOCUMENTS

| | | | |
|---|---|---|---|
| 0471118 | 2/1992 | European Pat. Off. | H04N 5/92 |
| 4086180 | 3/1992 | Japan | H04N 5/92 |

*Primary Examiner*—Thai Q. Tran
*Assistant Examiner*—Huy Nguyen
*Attorney, Agent, or Firm*—Sughrue, Mion, Zinn, Macpeak & Seas

[57] ABSTRACT

A method for recording images in a digital video cassette recorder, which utilizes high compressibility, and which is advantageous in an interframe coding method, includes steps for regularly and repeatedly recording low-frequency data of an intraframe corresponding to the outline of a picture in a group of pictures (GOP) unit and providing remaining data recording area in an end area of each GOP unit to permit data quantity fixation and in order to perform trick play operations. Furthermore, the method orders sub-images of a picture regularly or irregularly while recording the low-frequency data of all the sub-images which belong to a same cluster in low-frequency data recording area of each sub-image, to thereby raise picture quality during trick play.

12 Claims, 5 Drawing Sheets

FIG. 4A
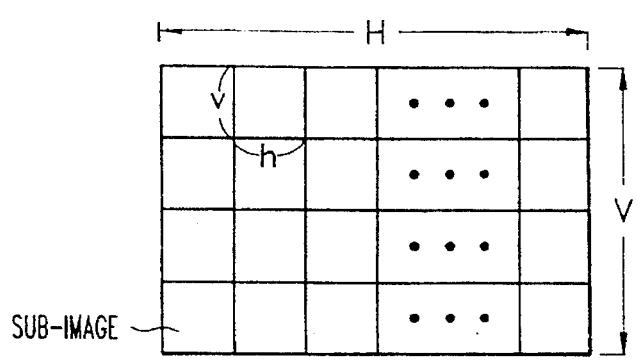
FIG. 4B
| 1 | 2 | 3 | 4 |
|---|---|---|---|
| 5 | 6 | 7 | 8 |
| 9 | 10 | 11 | 12 |
| 13 | 14 | 15 | 16 |
SUB-IMAGE
FIG. 4C
| 1 | 8 | 3 | 4 | 5 | 6 |
|---|---|---|---|---|---|
| 7 | 4 | 5 | 6 | 7 | 4 |
| 3 | 1 | 2 | 1 | 2 | 7 |
| 5 | 6 | 8 | 2 | 8 | 3 |
SUB-IMAGE
FIG. 5
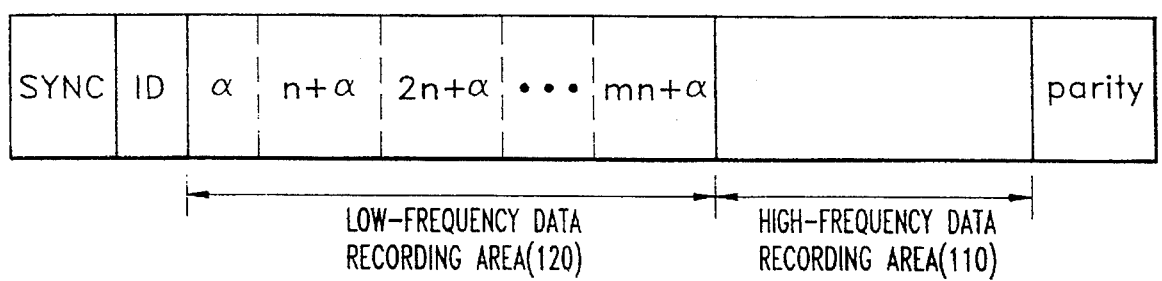

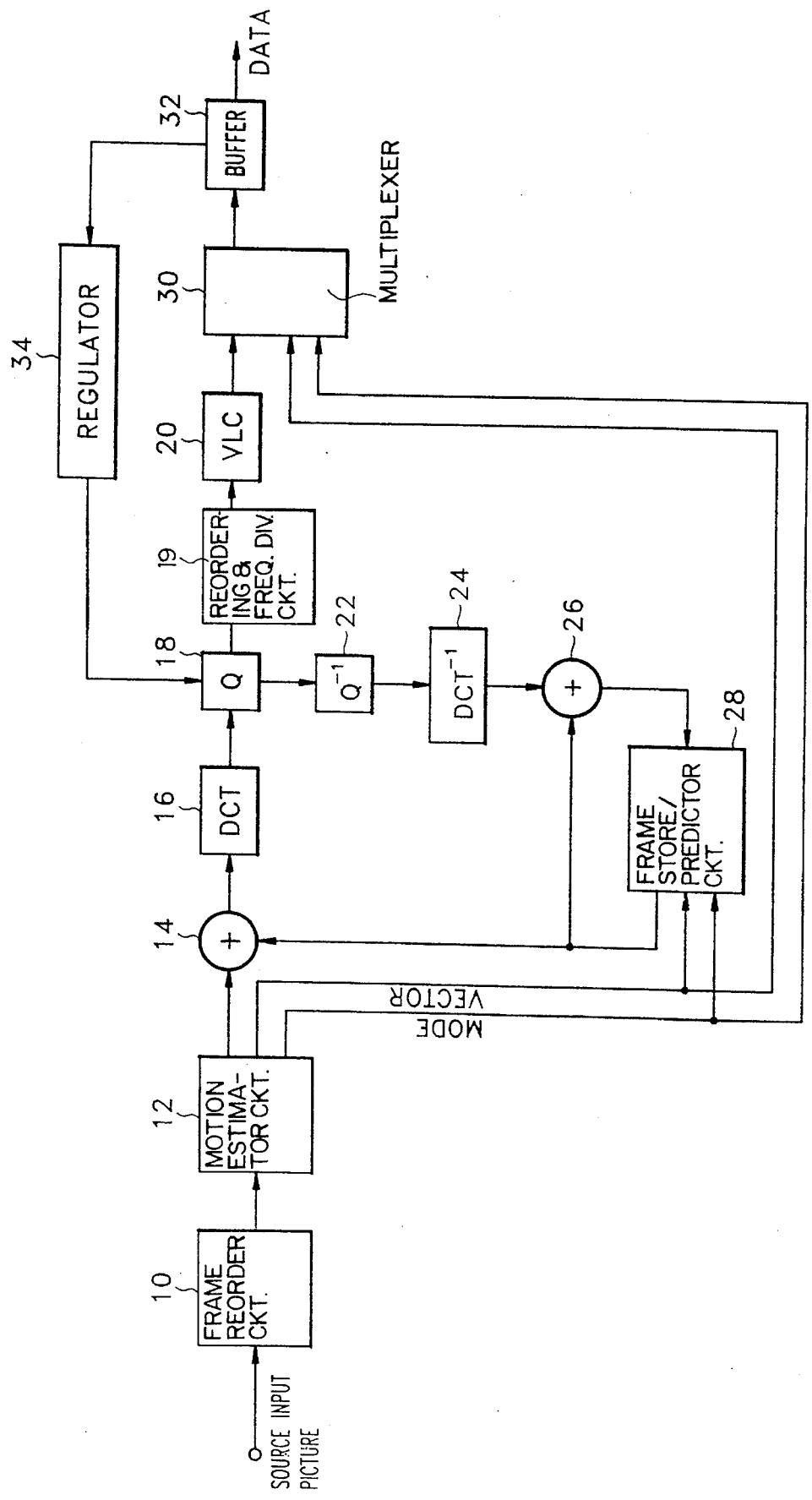

METHOD FOR RECORDING IMAGES IN A DIGITAL VIDEO CASSETTE RECORDER

FIELD OF THE INVENTION

The present invention relates to a digital video cassette recorder (DVCR). More particularly, the present invention relates to a method for recording images in a digital video cassette recorder capable of maintaining a constant data rate for an amount of data, performing a trick play and raising the quality of the reproduced picture during the trick play while using high compressibility which is an advantage in an interframe coding method.

Korean Patent Application Nos. 92-22705 and 93-21451 are incorporated herein by reference for all purposes.

BACKGROUND OF THE INVENTION

Due to the advanced development of digital video technology in the 1980s, digital video compression technology is now used in various electronic applications and in communication fields such as video conferencing, a digital broadcast codec and video telephones. A signal band compression method for DVCRs, which has been under development for the past several years, has adopted an intraframe coding method in which the redundancy of inter-pictures is not considered. However, since data compression using intraframe coding method does not eradicate redundancy within a digital image, the compression efficiency of the data is, thus, not very high.

Attempts are now being made to use an interframe coding method as a motion video compression method for eradicating temporal redundancy particularly in DVCR data compression. Since the interframe coding method can eradicate redundancy of inter-pictures, its signal compression rate is higher than that of the intraframe coding method.

For example, if an NTSC signal is sampled at a sampling ratio of 4:2:2, data of about 158 Mbps is generated. For recording this data on tape, the data should be compressed to about 25 Mbps. According to experimental results, when like amounts of the compressed result data are compared, the compression result of the interframe coding method shows remarkably better performance than that of the intraframe coding method. Thus, the conclusion can be reached that the interframe coding method should be used for data compression in a DVCR.

However, even though the interframe coding method has an admitted advantage, it has not been used in DVCRs due to specific characteristics of the tape, e.g., the recording medium. When the data is recorded on the recording medium such as tape, a constant data rate, i.e., a fixed data rate, is necessary. It will be noted that such a constant data rate is difficult to obtain.

An encoder of the Motion Picture Experts Group (MPEG) is a representative means for coding an interframe video signal, which has been proposed to solve the constant data rate problem.

FIG. 1 is a block diagram of one example of a general MPEG motion video encoder. A brief explanation for the operation of the MPEG motion video encoder is as follows.

Frame-reorder 10 receives a source input video signal and performs color coordinate conversion, sub-sampling and block division. Motion estimator 12 estimates similar portions between a preceding picture and the following picture, to thereby detect a position movement result as vector data and output video signal data, vector data and mode data I, B and P. Here, mode data I, B and P represent classes of the picture. The I-picture is an intra-coded picture which is obtained by eradicating only spacial redundancy. The P-picture, or predicted picture, is predicted from the I-picture and is obtained by encoding only the differences. Thus, the P-picture can be said to eradicate similar portions between the I-picture and the P-picture. On the other hand, the P-picture has motion vector data generated during prediction as additional data. The B-picture is located between the I-picture and the P-picture. By bi-directionally predicting from the I-picture and the P-picture, a B-picture is obtained by encoding prediction errors. The amount of I-picture data is greater than that of the P-picture data which is greater than that of the B-picture data. Since the amount of each picture's data (I, P and B) is not uniform, a buffer 32 is provided to maintain a constant data transmission rate in a transmission path, to thereby compensate for the amount of data. As described above, motion estimator 12 generates mode data I, B and P, and according to the mode data, generates both the video signal data and the motion vector data.

A first adder 14 adds the video signal data output from frame storage/predictor 28 to the video signal data output from motion estimator 12. Discrete cosine transform (DCT) circuit 16 performs energy compression of the video signal data supplied from first adder 14, to perform a discrete-cosine-transform operation to the generally distributed video signal and have the thus-operated video signal distributed densely in a certain area.

Quantizer 18 quantizes the energy compressed video signal output from DCT circuit 16 into a predetermined quantization level (Q-level or step-size), and performs run-length-coding of the quantized video signal.

A variable-length-coding (VLC) circuit 20 compresses the quantized and run-length-coded video signal supplied from quantizer 18. That is, among signals having 256 levels represented as eight bits, higher frequency data is represented with fewer bits, while lower frequency data is represented with more bits. Accordingly, the total number of the bits representing the video signal is reduced.

Inverse-quantizer 22 receives the quantized video signal output from quantizer 18, and restores the received signal into the signal prior to quantization. Inverse-DCT ($DCT^{-1}$) circuit 24 receives the output from inverse-quantizer 22, and restores the received signal into the signal prior to a discrete-cosine-transform operation being performed. Second adder 26 adds the output of inverse-DCT circuit 24 to the output of frame storage/predictor 28, compensates for location movement of the preceding picture, which is received from second adder 26 and stored, according to the motion vector data and the mode data output from motion estimator 12.

Multiplexer 30 selectively outputs the video signal data compressed in and generated from VLC circuit 20, the motion vector data and the mode data I, B and P generated from motion estimator 12.

Buffer 32 temporarily stores data output by multiplexer 30, since the data length from multiplexer 30 is not uniform, to permit output of the stored data at a constant rate. Buffer 32 determines a quantization level according to the quantity of the data and controls quantizer 18 via regulator 34 based on the quantization level. If the data quantity in buffer 32 is high, the quantization level is increased to reduce the amount of data. Meanwhile, if the data quantity is low, the quantization level is reduced to increase the amount of data.

As described above, a video signal whose data output quantity is constantly adjusted is finally recorded on the recording medium (tape). During recording on the tape, one frame of video data is divided and recorded on four video tracks, according to the particular characteristics of the DVCR. However, since the video signal is divided and recorded on multiple tracks in the above conventional recording method, image regeneration is impossible during such trick play operations as high speed searching.

Considering the above problem, in order to enable high speed searching in a digital VCR, a separate method for recording one frame of a video signal on the expected running track of a head during trick play operations has been proposed. However, since this method should accurately estimate the running track and accurately follow the running track during trick play, various technical difficulties have been encountered and certain problems in utilization are present. Also, since constant data rate is not completely achieved, the data amount of the inter-pictures is not uniform.

On the other hand, the compressed and coded data is different from the analog signal, and, thus, the data quantity of a given picture area does not match a predetermined size of the original picture. Hence, during trick play, the reconstruction performance of the original picture can not be higher than that of the analog signal. Since an unreconstructed area in the picture may remain if the compressed digital data is restored during trick play operation, a proper signal should be added in such an area, to prevent the degradation of picture quality.

SUMMARY OF THE INVENTION

The principal object of the present invention is to provide a method for recording images in a digital video cassette recorder capable of improving the quality of a reproduced picture by maintaining a constant data rate for data being recorded on a recording media.

Another object of the present invention is to provide a method for recording digital images so as to minimize data loss during trick play operations.

Yet another object of the present invention is to provide a method for digital image recording at a constant data rate while utilizing the high compressibility advantage in an interframe coding method.

Still another object of the present invention is to provide a method for recording images in a digital video cassette recorder by adding certain picture data to a tape to thereby avoid any empty portion in a picture. According to one aspect of the present invention, the inventive method advantageously fills the picture with compressed digital data recoverable during trick play operation.

These and other objects, features and advantages of the present invention are provided by a method for recording images on a tape in a digital video cassette recorder in groups of pictures (GOP) units formed by randomly combining an I-picture coded using only information of the corresponding picture itself, a B-picture coded using motion compensated prediction from a past and/or future reference picture and a P-picture coded using motion compensated prediction from the past reference picture, characterized in that low-frequency data of each sync block of the I-picture is recorded for a certain distance on each track for the I-picture, the B-picture and the P-picture, high-frequency data of each sync block of the I-picture is sequentially recorded on non-recorded empty area of the tracks for the I-picture, data of the P-picture is sequentially recorded on the area which remains after low-frequency data of the I-picture is recorded on the tracks for the P-picture, and the data of the B-picture is sequentially recorded on the area which remains after low-frequency data of the I-picture is recorded on the tracks for the B-picture.

These and other objects, features and advantages according to the present invention are provided by a method for recording images in a digital video cassette recorder in which a compressed digital video signal of each sub-image of a picture divided into a predetermined number of sub-images is divided into low-frequency data and high-frequency data, so that low-frequency data is recorded by a certain distance on tracks of tape and the high-frequency data is sequentially recorded on the remaining area of the tracks, characterized in that the predetermined number of sub-images is divided into a plurality of clusters in accordance with a predetermined method and then the low-frequency data of all the sub-images which belongs to a respective cluster is recorded together on the area recording the low-frequency data of each sub-image belonging to the same cluster.

These and other objects, features and advantages of the invention are disclosed in or apparent from the following description of preferred embodiments.

BRIEF DESCRIPTION OF THE DRAWINGS

The above objects and other advantages of the present invention will become more apparent by describing in detail a preferred embodiment thereof with reference to the attached drawings like elements are denoted throughout by like or similar numbers and in which:

FIGS. 4A through 4C show a picture composed of a plurality of sub-images;

FIG. 5 shows a type of sync block suitable for performing trick play operations according to the present invention; and FIG. 6 is a high level block diagram at a circuit which is useful in explaining the operation of the inventive method.

DETAILED DESCRIPTION OF THE INVENTION

Figure 1:
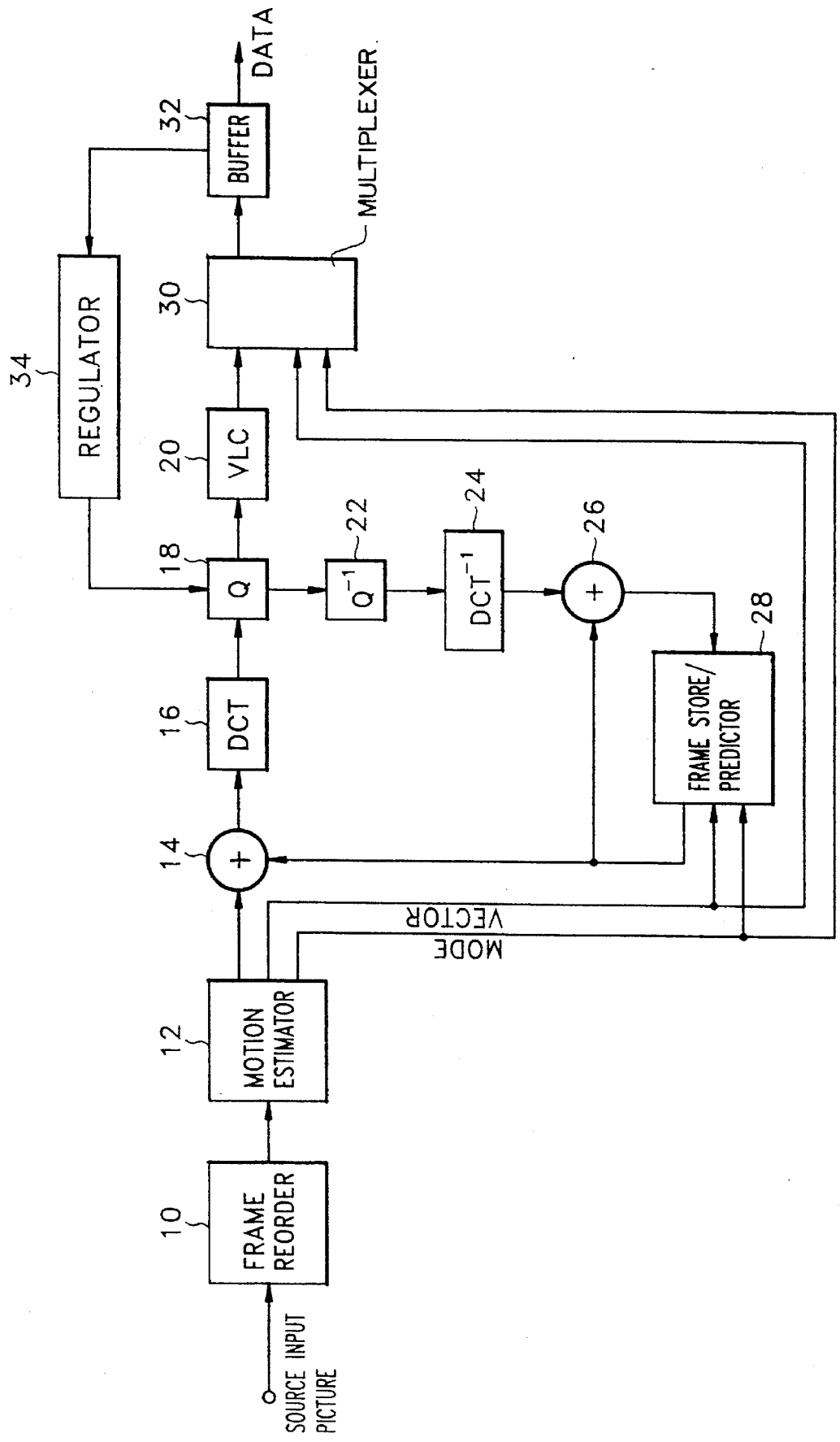
FIG. 1 is a block diagram of a general motion picture encoder.
Figure 2:
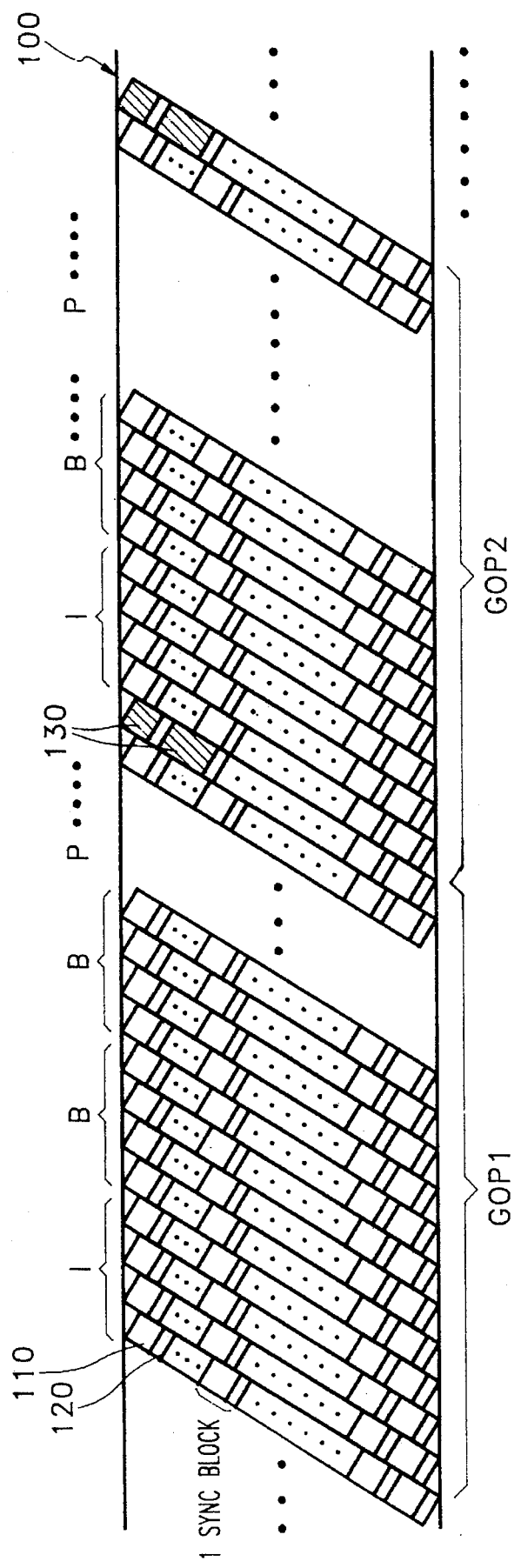
FIG. 2 shows a tape recording format according to the present invention.

The present invention will be described below with reference to the accompanying drawings FIGS. 1 through 3. FIG. 2 shows one example of a tape format in which data is recorded by an image recording method by a DVCR according to the present invention.

In FIG. 2, one frame of digital video data is recorded using tour tracks of recording medium 100. As for pictures obtained by the motion picture compressing method, one case is composed of an the I-picture coded using only information of the corresponding picture itself as an intraframe, a B-picture coded using a motion compensated prediction bi-directionally, e.g., from a past and/or future reference picture and a P-picture coded using a motion compensated prediction from the past reference picture, i.e., the I-picture. The other case is composed of merely the I-picture and the P-picture. The present invention will be described using the former case as an example.

When pictures to be recorded consist of the I-picture, the B-picture and the P-picture, even though there can be many ways for ordering the pictures to be recorded on the tracks of recording medium 100, an exemplary case being recorded in the order of [I, B, B, P, B, B, P . . . , I] will be described. Of course, the digital data for the I-picture, the B-picture and the P-picture are respectively recorded on the four tracks of recording medium 100.

Here, the video signal recording method according to this invention will be described below first referring to the FIG. 2. In FIG. 2, low-frequency data for the I-picture, which represents an outline of a picture, is recorded in low-frequency data recording areas 120 periodically formed on the tour tracks constituting the I-picture. Also, the low-frequency data of the I-picture is regularly recorded in low-frequency data recording areas 120 periodically formed on the tracks of the B-picture and the P-picture. The high-frequency data of the I-picture is recorded in high-frequency data recording areas 110 periodically formed on the four tracks constituting the I-picture. B-picture and P-picture data are advantageously recorded in the portion, i.e., the area in which the low-frequency data of the I-picture is not recorded.

Furthermore, in the method for recording video signals in a DVCR according to this invention, the fixing of data quantity is accomplished by grouping N pictures into one group. Here, N is any integer greater than one. The group is called a group of pictures (GOP). A track length (as long as the buffer size or as long as the maximum size to be occupied by the buffered data) is prepared as remaining data recording area 130, for every GOP. Thus, the data remaining in the buffer is recorded on remaining data recording area 130 of recording medium 100 every time a GOP encoding operation is concluded. By doing so, data quantity can be fixed. In fact, the quantity of lost data is reduced because, during trick play, a sufficiently large area on the recording medium is utilized as the remaining data recording area.

As described above, low-frequency data of the I-picture is regularly recorded again on the other tracks. Thus, the loss of data is reduced in any multiple speed mode. Of course, due to the utilization of only low-frequency data, picture quality is lowered. However, if picture quality is only slightly lowered, the human eye cannot recognize well this phenomenon in a random multiple speed mode. Accordingly, there is no problem in actual use.

If data of about 15 Mbps is consumed in encoding by the motion picture method, data of about 5 Mbps can be sufficiently used for trick play operation. That is, if the total data quantity is less than 20 Mbps, this is a quite acceptable data rate for recording media such as tape.

As described above with respect to FIG. 2, low-frequency data of the intraframe is recorded as regular and repetitive arrangements in a GOP unit. Therefore, a lost quantity of data is small although the recording medium runs in a random multiple speed mode, to thereby obtain a regenerated picture.

Next, the other embodiment of this invention will be described below. FIG. 3 shows a tape format according to the other embodiment of this invention. Since the tape format shown in FIG. 3 is the same as that shown in FIG. 2 except for the following descriptions, repetitious explanations can be omitted.

Figure 3:
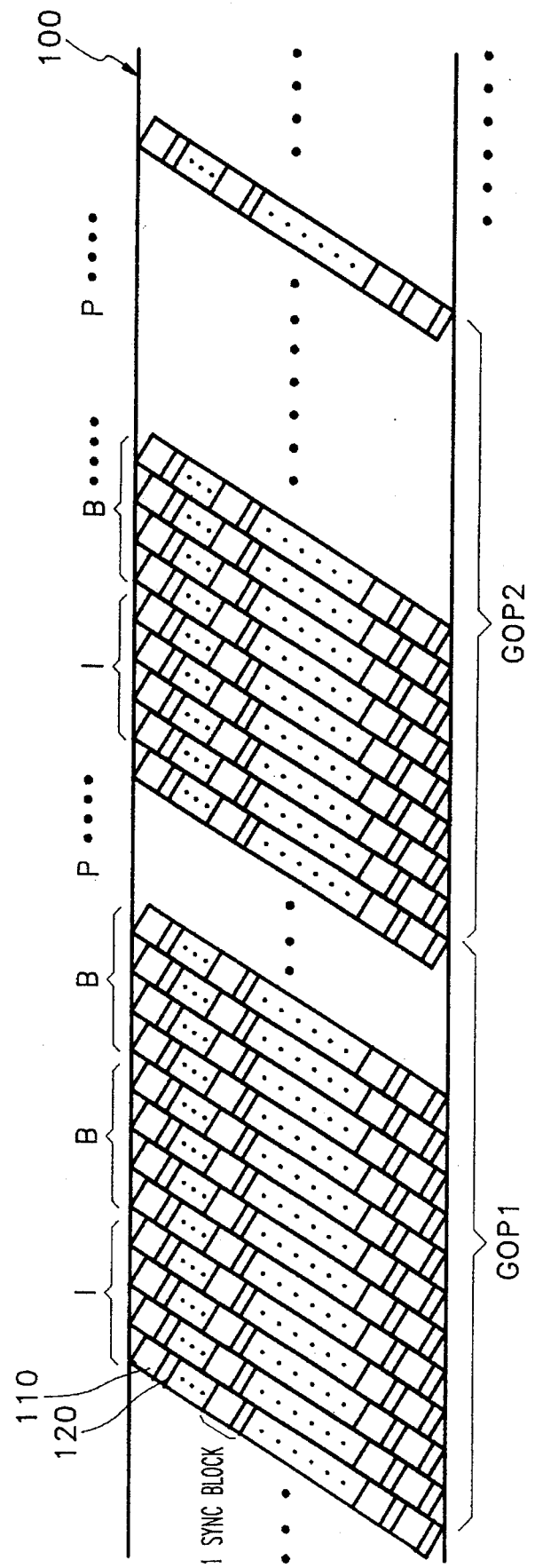
FIG. 3 shows another tape recording format according to the present invention.

The embodiment shown in FIG. 3 is different from the tape format shown in FIG. 2 in that the remaining data recording area of the buffer is not provided in the last portion of the GOP unit. Generally, for encoding and decoding, the encoding process is independently carried out in GOP units. Therefore, remaining data recording area 130 corresponding to the buffer in FIG. 2 cannot be provided by properly adjusting the bit rate of the buffer.

Next, the video signal recording method to achieve the other object of this invention will be described below referring to FIGS. 4A through 4C and FIG. 5.

As described above, this invention provides steps for reinforcing the function of trick play reproduction when compressing a motion picture and recording it on tape, thereby more accurately reconstructing the picture in fast-forward and reverse search modes of operation.

Generally, it is difficult to perfectly reconstruct the picture due to the characteristic of compressed digital data, even though one sync block is made to represent a certain area of the picture. Considering this problem, this invention provides a new recording method wherein the data quantity read by a magnetic head (not shown) is increased to obtain advantageous image reconstruction. That is, based on the above recording method which divides one sync block into low-frequency and high-frequency data and records the divided frequency data, this invention adopts a method that records not only the low-frequency data of a certain part of a picture but also the low-frequency data of various parts of the picture together in low-frequency data recording area 120. By doing so, as the information quantity read by the magnetic head increases and the information is uniformly distributed throughout the whole picture, the quality of the trick-play-reproduced image can be improved.

For this purpose, a picture is first divided into a plurality of sub-images which are then regrouped using a predetermined method. That is, one picture consists of a plurality of clusters, and each cluster consists of a plurality of sub-images.

There are two methods for ordering sub-images. One is to order in accordance with a rule and the other is to order randomly. While both methods will be described, the former will be described first.

One picture can be divided into a plurality of sub-images (or macroblocks) as shown in FIG. 4A in the case of a motion picture consisting of thirty frames per second. There are L sub-images per picture, as can be seen from equation (1), which assumes that a picture has H pixels horizontally and V pixels vertically and a subimage has h pixels horizontally and v pixels vertically.

$$L = \left[ \frac{H}{h} \right] \left[ \frac{V}{v} \right] \quad (1)$$

Here, a symbol [β] represents the maximum integer not exceeding β. In mathematical notation, the representation of a variable (e.g., β) enclosed within brackets[] signifies the maximum integer which does not exceed a real number here as beta. Accordingly, [β] represents the maximum integer not exceeding β, or given a real number of 5.678, then [β] equals five.

The sub-images are ordered, i.e., clustered, as follows using the concept of a remainder set, in the case of a picture being divided into L sub-images. Namely, as shown in FIGS. 4A, 4B and 4C, when sub-images are serially numbered from left to right and from top to bottom and the serial sub-images are divided by a divisor of a predetermined magnitude, the number having the same remainder, that is, the sub-image corresponding to the same remainder set, is classified into the same cluster.

According to the above method, one picture is divided into a number of clusters, thereby recording both the low-frequency data of other sub-images in the same cluster as well as the low-frequency data of the corresponding sub-image itself in low-frequency data recording area 120 of each sub-image belong to the same cluster. The sub-image has a sync block representing the sub-image. Accordingly, the clusters of data which are identical to each other are recorded in low-frequency data recording area 120 of the sync block of each sub-image belonging to the same remainder set, while the original data of each sub-image, that is, the clusters of data which are different from each other, are recorded in the high-frequency data recording area 110. In other words, not only low-frequency data of itself but also the low-frequency data of other sub-images which are involved in a remainder set including the sub-image itself is recorded in low-frequency data recording area 120 of each sub-image belonging to a certain remainder set. At this time, in high-frequency data recording area 110 for each sub-image, only the high-frequency data of the corresponding sub-image itself is recorded.

A high level block diagram which advantageously permit clustering according to the present invention will be briefly described while referring to FIG. 6. It will be appreciated such ordering, e.g., clustering, can be done by zigzag reordering and one-dimensionally arranging the quantized DCT coefficients via some means which can be located between quantizer 18 and VLC 20 of FIG. 1 and that all other elements of FIG. 1 would remain unchanged. In this case, a predetermined number of AC coefficients are selected from the DCT coefficients and the selected AC coefficients are recorded in the low-frequency data recording area. Thus, a reordering and frequency division means circuit 19 can advantageously be disposed between quantizer 18 and VLC 20."

A detailed descriptions of a preferred embodiment according to the present invention will now be provided while referring to FIGS. 4B and 5. It is assumed that there is a picture consisting of sixteen sub-images in total as shown in FIG. 4B. FIG. 4B assumes that dividend L, i.e., the number of sub-images, is sixteen. The low-frequency data of only of itself is recorded in low-frequency data recording area 120 of each sync block in the case of MOD(L,16). In the case of MOD(L,8), the data of low-frequency data recording area 120 of sync block 1 is equal to that of sync block 9. In the case of MOD(L,4), low-frequency data recording areas 120 of sync blocks 1, 5, 9 and 13 have the same data.

The modulus (hence, MOD) function of MOD (L,M) in which L and M are positive integers, is defined as a set of numbers having the same remainder value when dividing "L" by "M". That is, the sub-image can be divided into a plurality of groups each of which has the same remainder value by performing the MOD function. Thus, if the L quantity of the sub-image is to be divided by eight, the function MOD(L,8) represents the sum of R(0), R(1), R(2), ... R(7) in which R represents a remainder set and the figure in the parentheses is a remainder value.

If the above example is generally represented, i.e., given that MOD(L,n)=α, the same data is recorded in low-frequency data recording area 120 of the sync blocks of the sub-images whose serially assigned numbers are α, n+α, 2n+α ... , mn+α (where mn≤L and m, n and α are positive integers). This is shown in FIG. 5 where one sync block is composed of a sync area, an identification area, low-frequency data recording area 120, high-frequency data recording area 110 and a parity area. It will be appreciated that a sync pattern is recorded in the sync area, an identification number of a certain sub-image is recorded in the identification area, and an error correction code is recorded in a parity area. Furthermore, while the high-frequency data of a certain sub-image itself is recorded in high-frequency data recording area 110, not only the low-frequency data of a certain sub-image itself but also the low-frequency data of other sub-images classified as the same sub-image cluster are recorded together in low-frequency data recording area 120. In the above description, the low-frequency data can comprise either the direct current component only or the direct current component together with the low-frequency data portion of the alternating current component.

On the other hand, a mapping table can be used as a method for randomly grouping sub-images, as shown in FIG. 4C, without relying on the method using the remainder set concept of MOD(L,n) explained above. The method using the random mapping table can be much more advantageous and flexible in raising the quality of a reproduced picture in a point that the sub-image can be irregularly or uniformly mixed. That is, if the low-frequency data recorded together is made to be a signal of the sub-image distributed evenly over the whole picture, the quality of the trick-play-reproduced image will be improved accordingly. Also, an effect of such a recording method will be different in accordance with the recording density of the tape. If the recording density becomes sufficiently high due to further technical development, much more of the sub-images' low-frequency data can be recorded in low-frequency data recording area 120 of one sub-image, thereby greatly improving the quality of the trick-play-reproduced image.

As described above, the interflame coding method can be effectively used in a DVCR since the DVCR image recording method according to this invention can fix the bit rate of data to be recorded on tape. Also, this invention enables trick play reproduction since, even though the recording medium passes at a random multiple speed, if one sync block is restored, the data of other sub-images classified into the same cluster as that of the sync block are restored at the same time. Furthermore, this invention can upgrade the quality of a trick-play-reproduced image by share-recording the low-frequency data of each sub-image which belongs to the same cluster.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for recording images on tape in a digital video cassette recorder in group of picture (GOP) units constituted by randomly combining an I-picture coded using only information of the corresponding picture itself, a B-picture coded using a motion-compensated prediction from a past and/or future reference picture and a P-picture coded using the motion-compensated prediction from the past reference picture, characterized in that low-frequency data representing each sync block of the I-picture is recorded in a low frequency recording area within a certain distance on each track for the I-picture, the B-picture and the P-picture, high-frequency data of each sync block of the I-picture is sequentially recorded on a high frequency recording area of the tracks for the I-picture, data of the P-picture is sequentially recorded on a first area which remains after low-frequency data of the I-picture is recorded on the tracks for the P-picture, and data of the B-picture is sequentially recorded on a second area which remains after low-frequency data of the I-picture is recorded on the tracks for the B-picture.

2. The image recording method according claim 1, wherein remainder data is recorded in a remainder data recording area of a predetermined size separately provided in a picture's end recording area of each said GOP unit on the track for fixing the data quantity of each said GOP unit.

3. The image recording method according to claim 2, wherein said predetermined size is a tape recording area corresponding to a respective data storage size of an output buffer for controlling an output bit rate of compressed and coded data.

4. A method for recording images in a digital video cassette recorder in which a compressed digital video signal of each sub-image of a picture divided into a predetermined number of sub-images is divided into low-frequency data and high-frequency data, so that low-frequency data is recorded in a low-frequency data recording area having a certain distance on each track of a length of tape and the high-frequency data of a single corresponding sub-image is sequentially recorded on the remaining area of each track, characterized in that the predetermined number of sub-images is divided into a plurality of clusters in accordance with a predetermined method and then the low-frequency data for all sub-images belonging to a specific cluster are recorded together on the low-frequency data recording area of each sub-image belonging to said specific cluster.

5. The method for recording image in a digital video cassette recorder according to claim 4, wherein when dividing said predetermined number of sub-images into said clusters, said sub-images, being evenly distributed over a whole picture, are classified so as to be included in the same cluster.

6. A method for recording images in a digital video cassette recorder in which a compressed digital video signal of each sub-image of a picture divided into a predetermined number of sub-images is divided into low-frequency data and high-frequency data, so that low-frequency data is recorded by a certain distance on tracks of a length of tape and the high-frequency data is sequentially recorded on the remaining area of the tracks, characterized in that the predetermined number of sub-images is divided into a plurality of clusters in accordance with a predetermined method and then the low-frequency data for all sub-images belonging to a specific cluster are recorded together on the low-frequency data recording area of each sub-image belonging to said specific cluster;

wherein when dividing said predetermined number of sub-images into said clusters, and when said predetermined number of sub-images are serially numbered from left to right and from top to bottom and each serially assigned sub-image number is divided by a divisor of a predetermined magnitude, the sub-image whose serially assigned number has the same remainder is classified into the same cluster.

7. The method for recording images in a digital video cassette recorder according to claim 4, wherein said low-frequency data comprises a direct current component only.

8. The method for recording images in a digital video cassette recorder according to claim 4, wherein said low-frequency data comprises a direct current component and low-frequency data portions of the alternating current component.

9. A method for recording images in a digital video cassette recorder in which a compressed digital video signal of each sub-image of a picture divided into a predetermined number of sub-images is divided into low-frequency data and high-frequency data, so that low-frequency data is recorded by a certain distance on tracks of a length of tape and the high-frequency data is sequentially recorded on the remaining area of the tracks, characterized in that the predetermined number of sub-images is divided into a plurality of clusters in accordance with a predetermined method and then the low-frequency data for all sub-images belonging to a specific cluster are recorded together on the low-frequency data recording area of each sub-image belonging to said specific cluster;

wherein the low-frequency data recording area of each sub-image has an associated identification number, wherein all sub-images belonging to said specific cluster are recorded together on the low-frequency data recording area of each sub-image belonging to said specific cluster, and wherein said high frequency data corresponding to said identification number is recorded in a respective portion of said remaining area following said identification number.

10. A method for recording images in a digital video cassette recorder in which a compressed digital video signal of each sub-image of a picture divided into a predetermined number of sub-images is divided into low-frequency data and high-frequency data, and formed into a plurality of recording blocks for recording on a tape, said method comprising the steps of:

(a) recording a sync block;

(b) recording an identification number corresponding to a respective sub-image;

(c) recording respective low-frequency data for all sub-images belonging to a specific cluster in a single recording block, wherein the predetermined number of sub-images is divided into a plurality of clusters in accordance with a predetermined method;

(d) recording the high frequency data associated with said identification number in said single recording block;

(e) recording a respective error code for said identification number; and (f) repeating steps (a) through (e) until all of said sub-images have been recorded.

11. The method for recording images in a digital video cassette recorder according to claim 10, wherein said low-frequency data comprises a direct current component only.

12. The method for recording images in a digital video cassette recorder according to claim 10, wherein said low-frequency data comprises a direct current component and low-frequency data portions of the alternating current component.

* * * * *